United States Patent [19]

Williamson

[11] Patent Number: 4,569,055
[45] Date of Patent: Feb. 4, 1986

[54] FOREHEARTH ELECTRODE FIRING

[75] Inventor: Michael Williamson, Granville, Ohio

[73] Assignee: Owens-Corning Fiberglas Corporation, Toledo, Ohio

[21] Appl. No.: 646,597

[22] Filed: Aug. 31, 1984

[51] Int. Cl.⁴ ............................................. C03B 5/027
[52] U.S. Cl. .................................................... 373/39
[58] Field of Search ...................... 373/39, 40, 41, 32, 373/120, 122

[56] References Cited

U.S. PATENT DOCUMENTS

| | | | |
|---|---|---|---|
| 3,855,412 | 12/1974 | Maddux | 373/40 |
| 3,885,945 | 5/1975 | Rees et al. | 65/136 |
| 4,000,360 | 12/1976 | Gell et al. | 373/41 |
| 4,049,899 | 9/1977 | Shimizu et al. | 373/40 |
| 4,211,887 | 7/1980 | Williamson | 373/41 |
| 4,247,733 | 1/1981 | Stevenson | 373/39 |
| 4,282,393 | 8/1981 | Williamson | 373/41 |
| 4,309,567 | 1/1982 | Williamson | 373/39 |
| 4,410,997 | 10/1983 | Gell et al. | 373/40 |
| 4,410,998 | 10/1983 | Germann et al. | 373/40 |

Primary Examiner—Roy N. Envall, Jr.
Attorney, Agent, or Firm—Ronald C. Hudgens; Patrick P. Pacella; Ronald E. Champion

[57] ABSTRACT

Pairs of electrodes are symmetrically placed about the bend of a forehearth of a glass melting furnace. The electrodes are connected to the dual secondary windings of a step down transformer such that the firing paths of the electrodes cross each other in the molten material. The flow of the material across the firing paths coupled with the electrodes being connected to the dual secondaries of a common step-down transformer prevents hot spots and produces a balanced current flow across both firing paths.

4 Claims, 2 Drawing Figures

FOREHEARTH ELECTRODE FIRING

TECHNICAL FIELD

This invention relates to the field of melting furnaces and, particularly, to firing of electrodes located in the bend of a forehearth of an electrically heated glass melting furnace by using transformers with dual secondary winding to fire electrodes symmetrically placed about the bend.

BACKGROUND ART

In an electric glass melting furnace, heat is produced by Joule effect heating. Electrodes placed in the furnace are energized by a source of AC power, and current flows through the electrodes and through the melted material between the electrodes. Forehearths are connected to such furnaces to transport the molten material to forming position where the molten material is transformed into usable products. The molten material, as it flows along the forehearth, loses heat, and means must be provided to supplement this heat loss. One of the problems with providing this heat by Joule effect heating is that molten glass has a negative heat coefficient of resistance. The hotter the molten material the less electrical resistance that it provides. This can produce hot spots where more power is drawn to areas of hotter glass.

The prior art shows a number of attempts to limit and balance the power introduced between co-operating electrodes in a furnace. Rees, et al., U.S. Pat. No. 3,885,945, shows an individual transformer and controller for each pair of electrodes. Maddux, U.S. Pat. No. 3,855,412, uses a common transformer and magnetic induction coupling to achieve a balance among a group of co-operating electrodes. Williamson, U.S. Pat. No. 4,211,887, uses a single transformer with symmetrical taps on the secondary winding to achieve a distribution of voltages among electrodes.

DISCLOSURE OF INVENTION

In this invention, a transformer having a primary and a first and a second independent identical secondary winding is used to fire at least two pair of electrodes placed through the sidewalls of the forehearth of a melting furnace into molten material to heat the molten material by Joule effect heating. The two pair of electrodes are inserted through the sidewalls of the forehearth symmetrically about a bend in the forehearth. The first pair of electrodes are positioned through the sidewalls into the molten material upstream of the bend of the forehearth. The second pair of electrodes are positioned through the sidewalls of the forehearth downstream of the bend. The first secondary winding of the transformer having two electrical leads has the first lead connected to an electrode of the first pair of electrodes, and the second lead connected an electrode of the second pair of electrodes. Similarly, the second secondary winding having two leads has one lead connected to the remaining electrode of the first pair of electrodes and the second lead connected to the remaining electrode of the second pair of electrodes. The two secondary windings, when connected to the electrodes, are connected in such a manner that the same secondary windings will not be connected to electrodes in each pair of electrodes that are adjacent. In this manner, the distance between the co-operating electrodes connected to the first secondary winding and the distance between the co-operating electrodes connected to the second secondary winding will be the same. Similarly, a line drawn between the co-operating electrode connected to the first secondary winding of the transformer will cross a line drawn between the co-operating electrodes connected to the second secondary winding of the transformer. Electrical power is supplied to the primary winding of the transformer. The power is transferred into the secondary windings, through the electrode and through the molten material to heat the material by Joule effect heating. Any hot spot which develops upstream in the first set of co-operating electrodes, thereby attempting to imbalance the current flow, will move downstream balancing the current flow in the next set of co-operating electrodes.

BEST MODE OF CARRYING OUT THE INVENTION

Figure 1:
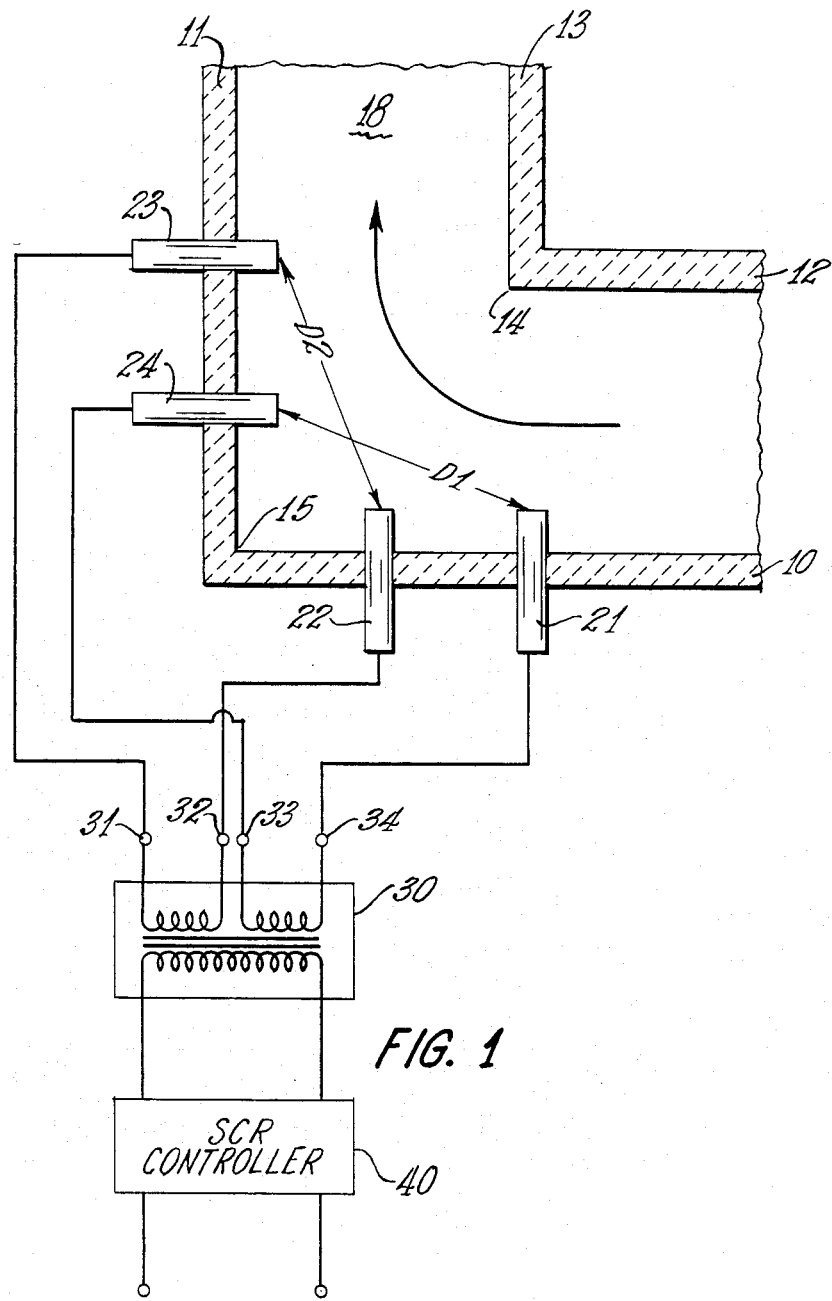
FIG. 1 shows the arrangement of electrodes symmetrically placed about a right angle corner of a forehearth and the connection of the electrodes to a transformer having dual secondary windings.
Figure 2:
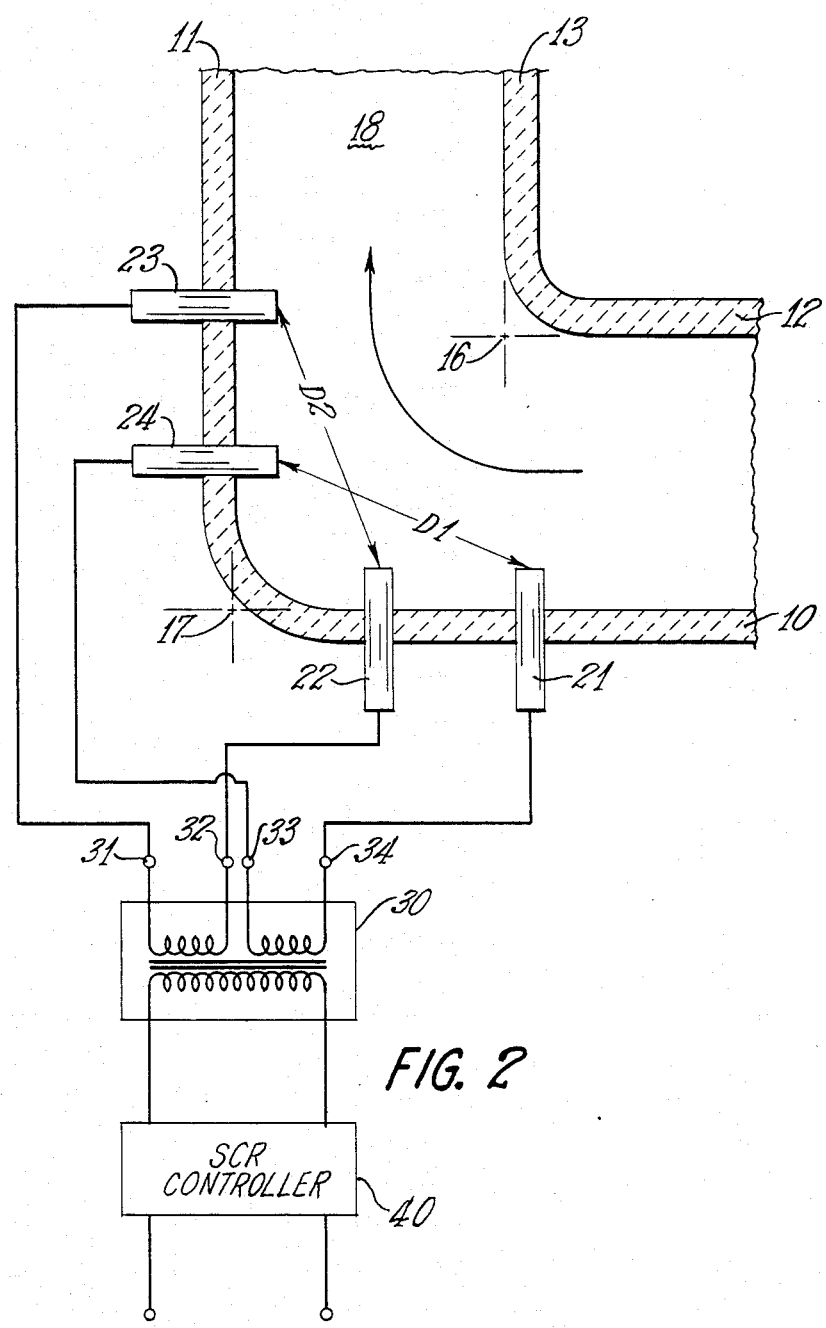
FIG. 2 shows the arrangement of electrodes about any bend in a forehearth and the connection of the electrodes to a transformer having dual secondary windings.

Referring to FIG. 1, a top view of a forehearth of a glass furnace is shown. The vertical outside wall of the forehearth is defined by refractory wall 10 which is perpendicular to refractory wall 11 at intersection 15 forming a right angle bend in the forehearth. An inner refractory wall 12 parallel to outside wall 10 is perpendicular to inside wall 13 which is parallel to outside wall 11 at intersection 14. This forms a channel for molten glass 18 to flow in the direction of the arrow. Electrodes 21 and 22 intersect wall 10 and are perpendicular to wall 10. Preferably, electrode 21 is positioned opposite inside cover 14, and electrode 22 is positioned midway between electrode 21 and outside corner 15. Similarly, electrodes 23 and 24 intersect and penetrate wall 11 perpendicular to the wall. Preferably, electrode 23 is opposite inside corner 14, and electrode 24 is midway between electrode 23 and inside wall 15. A silicon controlled rectifier (SCR) controller 40 is connected to line power (not shown). The output of this SCR feeds transformer 30. The transformer is a standard step down transformer having dual secondary windings. The first winding has nodes 31 and 32. Node 31 is connected to electrode 23 while node 32 is connected to electrode 22. Similarly, the second secondary winding has nodes 33 and 34. Node 33 is connected to electrode 24 while node 34 is connected to electrode 21. The placement of the electrodes has been described in a preferred embodiment as to their placement to corners of the forehearth. This is merely preferred as the critical position is such that the distance between co-operating pairs of electrodes must be equal. In FIG. 1, the distance between cooperating electrodes 21 and 24 designated D1 must be equal to the distance between cooperating electrodes 22 and 23 designated D2. This allows any configuration of bends to be accommodated. Referring to FIG. 2, it can be seen that there is no defined inside corner nor a defined outside corner. This invention will still be valid if a virtual inside corner 16 and a virtual outside corner 17 are used as placement as long as distance D1 equals the distance D2. The firing path D1 must also cross firing path D2.

When a hot spot attempts to develop between electrodes 21 and 24 along path D1, the current between those electrodes will attempt to increase because the resistance has decreased. This hot spot, however, moves along the forehearth due to the glass flow into the area of firing path D2. This is the path between electrode 22 and 23. These electrodes will attempt to supply more current thereby limiting the current to electrodes 21 and 24. The hot spot will then flow past electrode 23 out of the path of any of the electrodes.

The temperature of the molten material in the vicinity of a bend in the forehearth varies with distance from the sidewall. The molten material nearer the sidewall is generally colder than the molten material near the center of the channel. This is due to heat being transmitted to the sidewall and radiated away from the molten material in contact with the sidewall. The placement of the present electrodes, symmetrically about the bend, and the interconnection of these electrodes places one electrode of each firing pair in relatively hotter molten material and the other electrode in the same firing pair in relatively colder molten material. The total resistance between each firing pair of electrodes is equal, therefore leading to balanced current flows in each pair of electrodes.

The molten material between each firing pair of electrodes along paths designated D1 and D2 can be considered as a series connection of small resistance elements. The elements close to the electrode in the hot glass will have a lower resistance than the elements close to the cold electrode due to the negative coefficient of resistance of the glass. Because the same current must flow through each firing pair and the secondary winding associated with that electrode pair, the molten material closest to the cold electrode will receive more power due to the resistance R being greater and power being $I^2R$ where I is the current and the current is the same throughout the path.

If a slug of hot molten material should travel down the forehearth, both upstream electrodes of both circuits will experience this molten material at approximately the same time; and, by the previously stated process, this molten material will receive less energy from the firing circuit. As the hot slug passes onto the downstream electrodes, the process will be repeated. This leads to an averaging of glass temperature passing around the bend. Because heat is automatically added to the colder molten material of the bend along the sidewalls and adds no heat to the center of the bend, the glass flows away from the sidewalls thereby averaging the temperature throughout the bend.

INDUSTRIAL APPLICABILITY

This invention allows a single transformer having dual secondary windings to fire two pair of electrodes in the corner or bend of a forehearth of a glass melting furnace and achieve current balance between the electrodes.

I claim:

1. A balanced firing configuration for electrodes comprising:
    (a) a forehearth having sidewalls and a bottom for transporting a molten material, said forehearth having a bend to change direction of flow of said molten material;
    (b) at least a first and a second pair of electrodes protruding through said sidewalls of said forehearth into said molten material, said pairs of electrodes spaced symmetrically about said bend in said forehearth;
    (c) a transformer with a primary winding connected to a source of alternating current electric power and a first and a second identical independent secondary winding;
    (d) said first secondary winding connected to an electrode of said first pair of electrodes and also connected to a non-adjacent electrode of said second pair of electrodes; and
    (e) said second secondary winding connected to the remaining electrodes.

2. A balanced firing configuration for electrodes comprising:
    (a) a furnace for melting particulate material into molten material;
    (b) a forehearth having sidewalls and a bottom for transporting the molten material from the furnace;
    (c) a bend in the forehearth found by intersecting sidewalls to change the direction of flow of the molten material;
    (d) at least a first pair and a second pair of electrodes protruding through the sidewalls of the forehearth into the molten material, said pairs of electrodes placed symmetrically about the bend in the forehearth;
    (e) a step down transformer having a primary and at least a first and a second identical independent secondary winding;
    (f) said primary winding of said transformer connected to a source of alternating current electrical power;
    (g) said first secondary winding of said transformer connected to an electrode of said first pair of electrodes and connected to a non-adjacent electrode of said second pair of electrodes; and
    (h) said second secondary winding of said transformer connected to a remaining electrode of said first pair of electrodes and to a remaining electrode of said second pair of electrodes.

3. A balanced firing configuration for electrodes comprising:
    (a) a forehearth comprising a first and a second intersecting inside sidewall, a first and a second intersecting outside sidewall, a bottom connecting all said sidewalls, said first inside sidewall generally parallel to said first outside sidewall, said second inside sidewall generally parallel to said second outside sidewall and said bottom generally perpendicular to all sidewalls;
    (b) at least a first, second, third and fourth electrode protruding through said outside sidewalls generally perpendicular to said sidewall and generally parallel to said bottom;
    (c) said first electrode protruding through said first outside sidewall opposite the intersection of the first and second inside sidewall;
    (d) said second electrode protruding through said first outside sidewall, perpendicular to said first outside sidewall parallel to said first electrode midway between said first electrode and the intersection of said first and second outside sidewall;
    (e) said third electrode protruding through said second outside sidewall opposite the intersection of the first and second inside sidewall;

(f) said fourth electrode protruding through said second outside sidewall midway between said third electrode and the intersection of said first and said second outside sidewall; and (g) a transformer having a primary winding and a first and a second identical independent secondary winding, said first secondary winding electrically connected to said first and said fourth electrode, said second secondary winding electrically connected to said second electrode and said third electrode, such that the distance between said first electrode and said fourth electrode is the same as the distance between said second and said third electrode, but the electrical circuit between said first electrode and said fourth electrode is independent of the electrical circuit between said second electrode and said third electrode.

4. A method of heating a molten material flowing in a bend of a forehearth of a furnace, said method comprising the steps of:

(a) positioning at least a first pair and a second pair of electrodes into a molten material symmetrical about a bend in a forehearth of a furnace;

(b) connecting an electrode from said first pair of electrodes to a first secondary winding of a transformer and connecting a non-adjacent electrode from said second pair of electrodes to said first secondary winding;

(c) connecting a remaining electrode from said first pair of electrodes to a second secondary winding of said transformer and connecting a remaining electrode from said second pair of electrodes to said second secondary winding; and (d) connecting a source of electric power to a primary winding of said transformer.

* * * * *